No. 840,080. PATENTED JAN. 1, 1907.
A. MILLER.
WIRE STRETCHER.
APPLICATION FILED SEPT. 15, 1906.
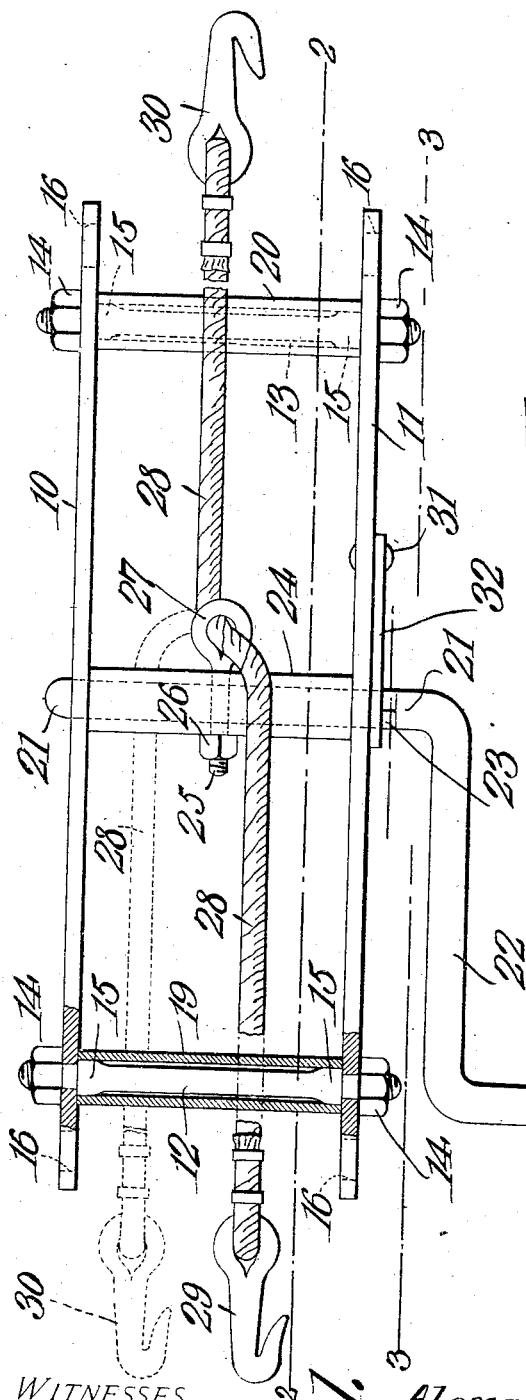
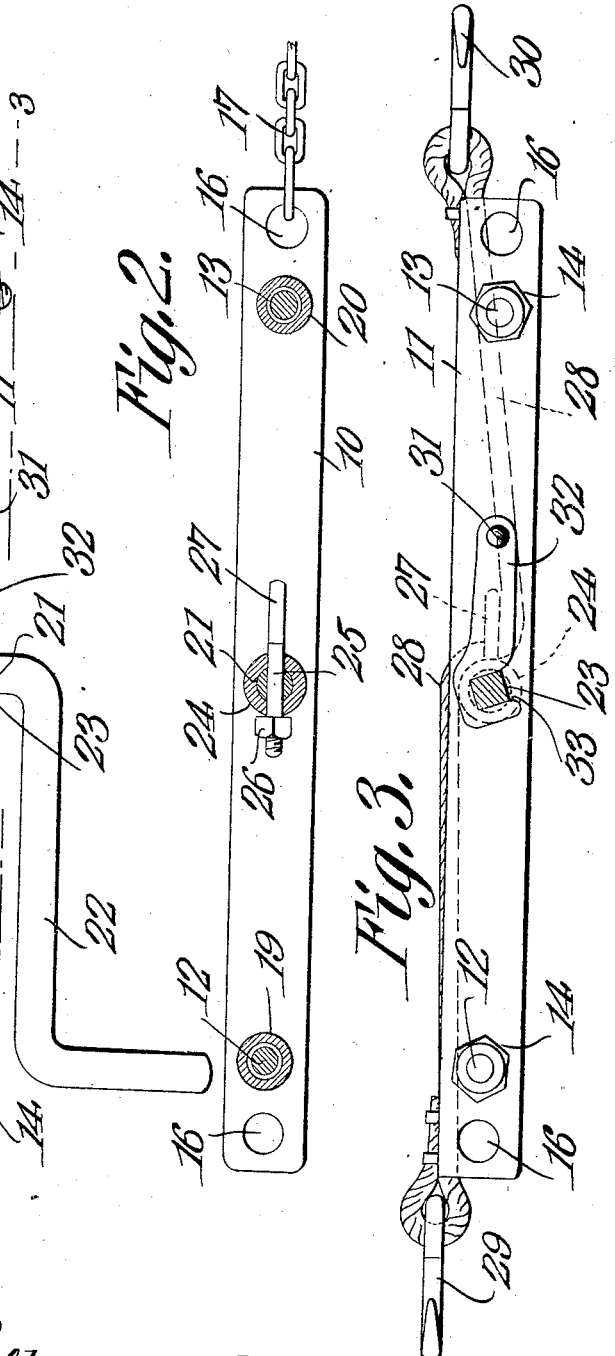
Alexander Miller, INVENTOR

UNITED STATES PATENT OFFICE.

UNITED STATES PATENT OFFICE.

ALEXANDER MILLER, OF SAN ANTONIO, TEXAS, ASSIGNOR OF ONE-HALF TO GEORGE LEONARD, OF SAN ANTONIO, TEXAS.

WIRE-STRETCHER.

No. 840,080.  Specification of Letters Patent.  Patented Jan. 1, 1907.

Application filed September 15, 1906. Serial No. 334,713.

*To all whom it may concern:*

Be it known that I, ALEXANDER MILLER, a citizen of the United States, residing at San Antonio, in the county of Bexar and State of Texas, have invented a new and useful Wire-Stretcher, of which the following is a specification.

This invention relates to devices for stretching wire, more particularly to devices of this character employed for stretching the strand members of wire fences and like structures, and has for its object to improve the construction and increase the utility and efficiency of the same.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a plan view, partly in section, of the improved device. Fig. 2 is a section on the line 2 2 of Fig. 1. Fig. 3 is a side view with the operating-shaft in section on the line 3 3 of Fig. 1.

The improved device comprises a supporting-frame constructed with spaced sides 10 11, connected by spaced transverse bolts 12 13, extending at their ends through the side members and with holding-nuts 14 exteriorly of the same, the bolts being "upset" near the ends, as at 15, to form shoulders for bearing against the inner faces of the side members. By this means a very strong rigid frame is produced, combining strength and lightness.

The bolts 12 13 are spaced from the ends of the side members 10 11, and the latter are provided with apertures 16 for receiving the binding-chains or like fastening means, (represented at 17,) and by which the frame is adjustably coupled to a post 18 or other stationary object, as hereinafter more fully explained.

Movably disposed upon the tie-bolts 12 13 are tubular rollers 19 20, the rollers bearing at the ends upon the upset portions 15 of the bolts. The upset portions thus serve the twofold purpose of shoulders to bear against the side members and holding them in position in coaction with the nuts 14 and also as bearings for the rollers, and limiting the friction between them and bolts.

Extending through the side members 10 11 intermediate their ends is a shaft 21, having an integral crank 22 at one end and with a "squared" portion 23 at the juncture of the shaft and its crank. The shaft is thus rotative in the frame and is surrounded between the side members by a sleeve 24, the sleeve being coupled to the shaft by a bolt 25, having a nut 26 at one end and an eye 27 at the other end. The bolt 25 thus serves the twofold purpose of a means for coupling the sleeve to the shaft and holding the latter rotatively in position in the frame and also as a means for coupling the straining element 28 to the shaft.

The straining element may be of any suitable material—such as a chain, a section of wire cable, or a section of rope, as may be required; but preferably finely-braided rope will be employed, such as braided sash-cord or the like. The member 28 may be of any required length and is passed loosely through the eye 27 of the bolt 25 and provided at the ends with wire-engaging hooks 29 30. Pivoted at 31 to the frame member 11 is a stop member 32, having a recess 33 corresponding to and adapted to engage the irregular portion 23 of the shaft, and thus hold the same from turning. By this means the shaft may be rotated in either direction and held rigidly from rotation in either direction, as will be obvious.

In operating the improved device for drawing the ends of a broken wire together the shaft 21 is released and rotated until the cable 28 is all "slacked off" and the terminal hooks 29 30 coupled to the broken wires at a sufficient distance from the ends to permit them to be coupled by twisting in the usual manner when brought together and overlapped. The shaft 21 is then rotated by its crank 22 in either direction and the cable wound upon the sleeve 24 by the action of the bolt 25 and its eye 27, drawing both portions of the wire toward the sleeve and overlapping their ends. The stop member 32 is then engaged with the irregular portion 23 of the shaft to hold the latter stationary and the wires strained while they are being coupled or otherwise secured. If the break occurs at a post, the strained and overlapped ends are simply stapled to the post; but if the break occurs between the posts the overlapped ends are secured by entwisting in the usual manner. If one wire only is to be strained, the frame members 10 11 are coupled by the chains 17 to a post or other stationary support 18 and the cable 28 looped around the eye 27 in any suitable manner to permit slipping, and both hooks are coupled to the broken wire at a sufficient distance from the end to enable the wire to be stapled or otherwise secured after the stretching action is completed, the hook 30 being in this case turned to the position shown by dotted lines in Fig. 1, as will be obvious. Broken wires may thus be stretched and repaired no matter what their condition or location may be. The device may also be employed in stretching the wires in erecting new fences, the operation being the same.

The device is simple in construction, can be inexpensively manufactured, is strong and durable, and operates effectually for the purposes described.

Having thus described the invention, what is claimed is—

1. A wire-stretcher comprising a frame having spaced sides connected near their ends by transverse bolts having lateral shoulders to maintain the side members spaced apart, tubular rollers rotative upon said bolts and bearing upon said shoulders, a windlass-shaft journaled in the frame members between said bolts, and a flexible straining element carried by said shaft.

2. The combination in a wire-stretcher, of a frame including spaced side members, shouldered connecting-bolts extending between and spacing said members, tubular rollers mounted on the bolts, a shaft journaled in the frame at a point about midway of the length of the latter, said shaft having a polygonal portion, a lock-pawl pivoted to the frame and having a recess arranged to receive the polygonal portion of the shaft to prevent rotative movement of the latter in either direction, a sleeve secured to the shaft, a bolt extending through the sleeve and shaft and having an eye at one end, and a flexible member extending through the eye and provided with wire-engaging means at both ends.

In testimony that I claim the foregoing as my own I have hereto affixed my signature in the presence of two witnesses.

ALEXANDER MILLER.

Witnesses:
AUGUST E. HUPPERTZ,
J. McCLELLAN, Jr.